United States Patent [19]
Kamiyama et al.

[11] Patent Number: 6,136,135
[45] Date of Patent: Oct. 24, 2000

[54] METHOD OF MANUFACTURING A PIPE LINER BAG

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shonan Gosei-Jushi Seisakusho K.K., Kanagawa-ken; Yokoshima & Company, Ibaraki-ken; Get Inc.; OAR Company, both of Saitama-ken, all of Japan

[21] Appl. No.: 08/974,835

[22] Filed: Nov. 20, 1997

[30] Foreign Application Priority Data

Nov. 21, 1996 [JP] Japan .................................... 8-310562

[51] Int. Cl.⁷ .................................................. B29C 63/36
[52] U.S. Cl. ......................... 156/294; 156/156; 156/287; 264/269; 264/314; 264/516
[58] Field of Search .................................... 156/287, 294, 156/156, 308.2; 264/269, 516, 314, 571

[56] References Cited

U.S. PATENT DOCUMENTS

| | | |
|---|---|---|
| 4,581,085 | 4/1986 | Wood . |
| 5,242,517 | 9/1993 | Endoh . |
| 5,407,630 | 4/1995 | Smith .................................... 264/269 X |
| 5,698,056 | 12/1997 | Kamiyama et al. ................. 156/287 X |

*Primary Examiner*—Sam Chuan Yao
*Attorney, Agent, or Firm*—Whitham, Curtis & Whith

[57] ABSTRACT

The present invention provides a method of readily manufacturing a multi-layer pipe liner bag with a good workability. A guiding tube is inserted into an outer layer composed of a tubular resin absorbent material and a plastic film coated over the outer periphery of the tubular resin absorbent material. An inner layer composed of another tubular resin absorbent material is inserted into the guiding tube, and the guiding tube is extracted with the outer layer and the inner layer being fixed. The tubular resin absorbent materials of the outer layer and the inner layer are with thermosetting resin to complete the pipe liner bag. Since the outer layer and the inner layer are manufactured separately, the manufacturing of the respective layers can be performed with a good workability. Also advantageously, the plastic film covering the outer surface of the outer layer can be prevented from scratches and so on.

34 Claims, 8 Drawing Sheets

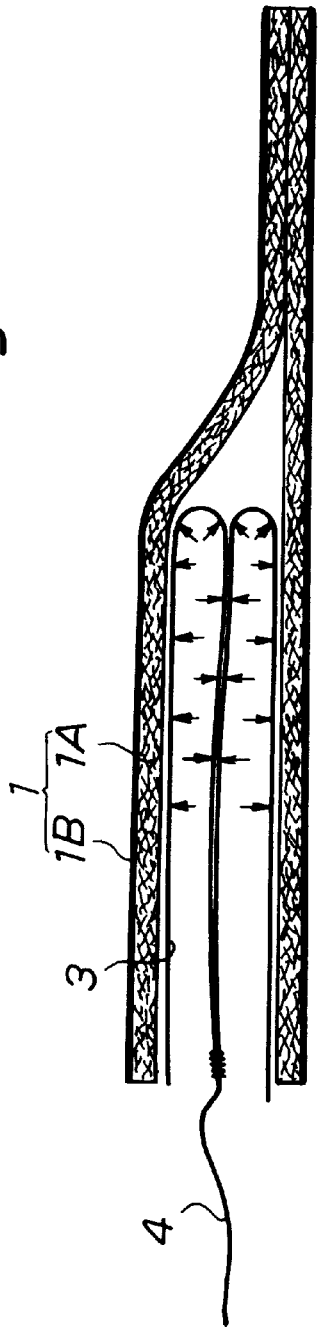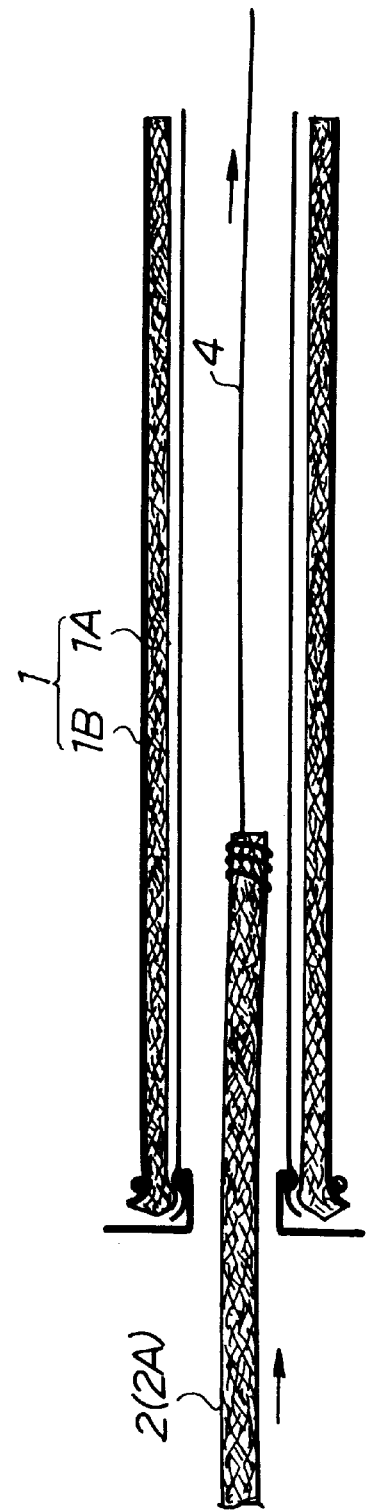

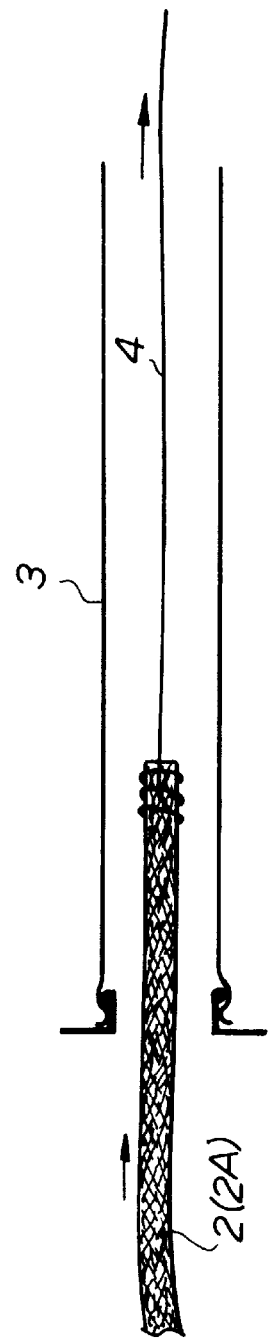
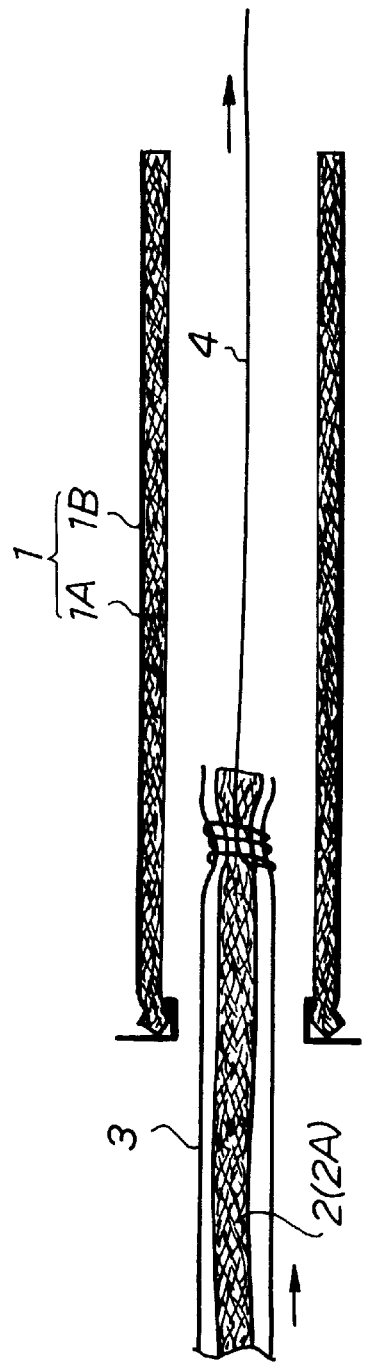

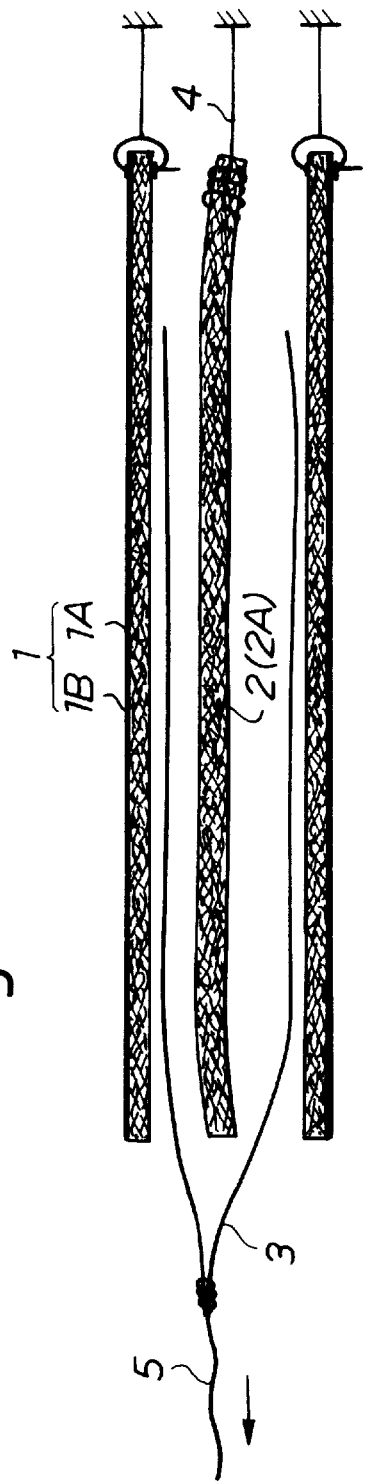
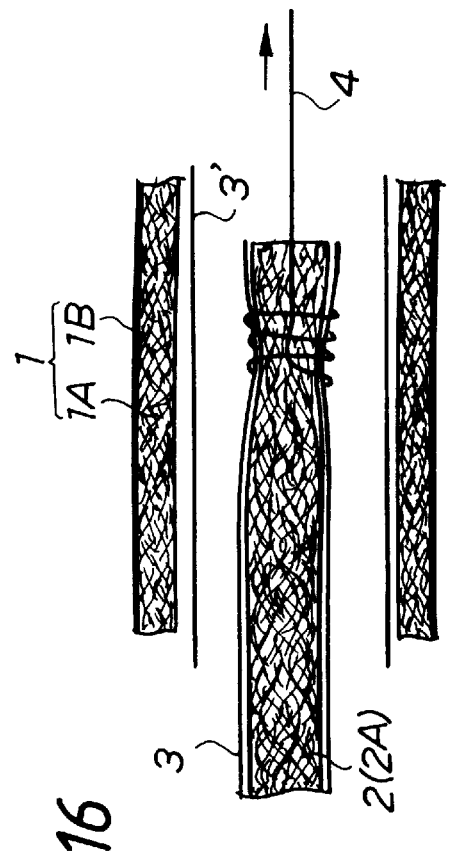
Fig. 15
Fig. 16

METHOD OF MANUFACTURING A PIPE LINER BAG

BACKGROUND OF THE INVENTION

1. Field of the Invention

The present invention relates to a method of manufacturing a pipe liner bag for use in repairing pipelines.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

In the pipe liner bag used in the above-mentioned pipe lining method, the thickness of the material of the pipe liner bag is adjusted in order to ensure a required strength. The adjustment of the thickness is typically made by laminating a plurality of tubular resin absorbent materials to form a multi-layer structure.

For example, when a pipe liner bag is formed of two layers of tubular resin absorbent materials for ensuring a required thickness, a resin absorbent material made of unwoven fabric is first rolled and both ends are joined to form a first layer of tubular resin absorbent material. Then, another strip-like resin absorbent material is surrounded over the first layer of tubular resin absorbent material and both ends are joined to form a second layer of tubular resin absorbent material. Then, the outer surface of the two-layer tubular resin absorbent material is coated with a plastic film. In this way, a pipe liner bag having a desired thickness is manufactured.

A process of coating the outer surface of the tubular resin absorbent material with the plastic film involves the work requiring the most expertise in the method of manufacturing the multi-layer pipe liner bag. However, since this coating is performed on a heavy multi-layer tubular resin absorbent material, there is a problem that the workability is extremely low. Particularly, for manufacturing a large-diameter and thick pipe liner bag, an operation for modifying a large and heavy pipe liner bag deviated from a machining line is hard, and the plastic film covering the outer surface of the pipe liner bag is often scratched during treatments of the pipe liner bag.

In addition, a process of surrounding a strip-like resin absorbent material over the outer periphery of the tubular-formed first resin absorbent material to form a second and subsequent layers of resin absorbent materials also involves hard work, so that a large amount of labor and time is required.

OBJECT AND SUMMARY OF THE INVENTION

The present invention has been made in view of the problems mentioned above, and it is an object of the invention to provide a method of manufacturing a pipe liner bag which is capable of readily manufacturing a multi-layer pipe liner bag with a good workability.

To achieve the above object, according to one aspect of the present invention there is provided a method of manufacturing a pipe liner bag comprising the steps of:

preparing an outer layer composed of a tubular resin absorbent material and a plastic film coated over the outer periphery of the tubular resin absorbent material;

inserting a guiding tube into the outer layer;

inserting an inner layer composed of another tubular resin absorbent material;

extracting the guiding tube with the outer layer and the inner layer being fixed; and impregnating the tubular resin absorbent materials of the outer layer and the inner layer with thermosetting resin.

According to a second aspect of the present invention, there is provided a method of manufacturing a pipe liner bag comprising the steps of:

inserting an inner layer composed of a tubular resin absorbent material into a guiding tube;

preparing an outer layer composed of another tubular resin absorbent material and a plastic film coated over the outer periphery of the tubular resin absorbent material;

inserting the inner layer covered with the guiding tube into the outer layer;

extracting the guiding tube with the outer layer and the inner layer being fixed; and impregnating the tubular resin absorbent materials of the outer layer and the inner layer with thermosetting resin.

According to a third aspect of the present invention, there is provided a method of manufacturing a pipe liner bag comprising the steps of:

preparing an outer layer composed of a tubular resin absorbent material and a plastic film coated over the outer periphery of the tubular resin absorbent material;

inserting a first guiding tube into the outer layer;

inserting an inner layer composed of another tubular resin absorbent material into a second guiding tube;

inserting the inner layer covered with the second guiding tube into the first guiding tube;

extracting the first and second guiding tubes with the outer layer and the inner layer being fixed; and impregnating the respective tubular resin absorbent materials of the outer layer and the inner layer with thermosetting resin.

Preferably, the guiding tube is inserted inside out into the outer layer by a fluid pressure.

Also preferably, the guiding tube is composed of a tubular film, a tubular composite film or a composite structure having layered plastic film and unwoven fabric or split fiber.

Further preferably, the guiding tube is applied with a lubricant.

The methods described above may further comprise the steps of:

after extracting the guiding tube, fixing one end of the outer layer and one end of the inner layer with a bolt, a nut, and washers;

sealing the outer layer and the inner layer with an end cover; and covering the bolt, the nut, and the washers with a jacket.

The outer layer may be manufactured by inserting a tubular resin absorbent material into the tubular plastic film, evacuating the tubular resin absorbent material to bring the plastic film into close contact with the outer surface of the tubular resin absorbent material, and heating the plastic film while maintaining the closely contacted state to weld the plastic film on the outer surface of the tubular resin absorbent material.

In this case, a highly air-tight pressure tube is inserted into the tubular resin absorbent material, the pressure tube is inflated with a fluid pressure to extend the plastic film and the tubular resin absorbent material outwardly in a circular tube shape, and the tubular resin absorbent material is evacuated to bring the plastic film into close contact with the outer surface of the tubular resin absorbent material.

The outer layer may be manufactured by rolling a strip-like resin absorbent material having a plastic film coated over one surface thereof with the plastic film facing the outside, joining both ends, and hermetically sealing the joined portion.

Thus, according to the present invention, the outer layer and the inner layer are separately manufactured, the manufacturing of each layer can be performed with a good workability. In addition, the plastic film coated on the outer peripheral surface of the outer layer is prevented from scratches. Furthermore, since the inner layer is inserted into the outer layer as the inner layer is guided by the guiding tube, so that the inner layer can be smoothly inserted into the outer layer. Once the inner layer has been completely inserted, the guiding tube is extracted to readily laminate the outer layer and the inner layer to provide a multi-layer structure. Then, the tubular resin absorbent materials of the outer layer and the inner layer are impregnated with thermosetting resin. In this way, a pipe liner bag having a desired thickness can be manufactured with a good workability.

The above and other objects, features, and advantages of the present invention will become apparent from the following detailed description of the preferred embodiments thereof when read in conjunction with the accompanying drawings.

BRIEF DESCRIPTION OF THE DRAWINGS

FIGS. 1 through 3 are cross-sectional views illustrating, in order, the steps of a manufacturing method according to a first embodiment of the present invention;

FIGS. 13 through 15 are cross-sectional views illustrating, in order, the steps of a manufacturing method according to a second embodiment of the present invention; and FIG. 16 is a partial cross-sectional view illustrating a manufacturing method according to a third embodiment of the present invention.

DESCRIPTION OF THE PREFERRED EMBODIMENTS

The present invention will hereinafter be described in connection with several preferred embodiments thereof with reference to the accompanying drawings.

Figure 3:
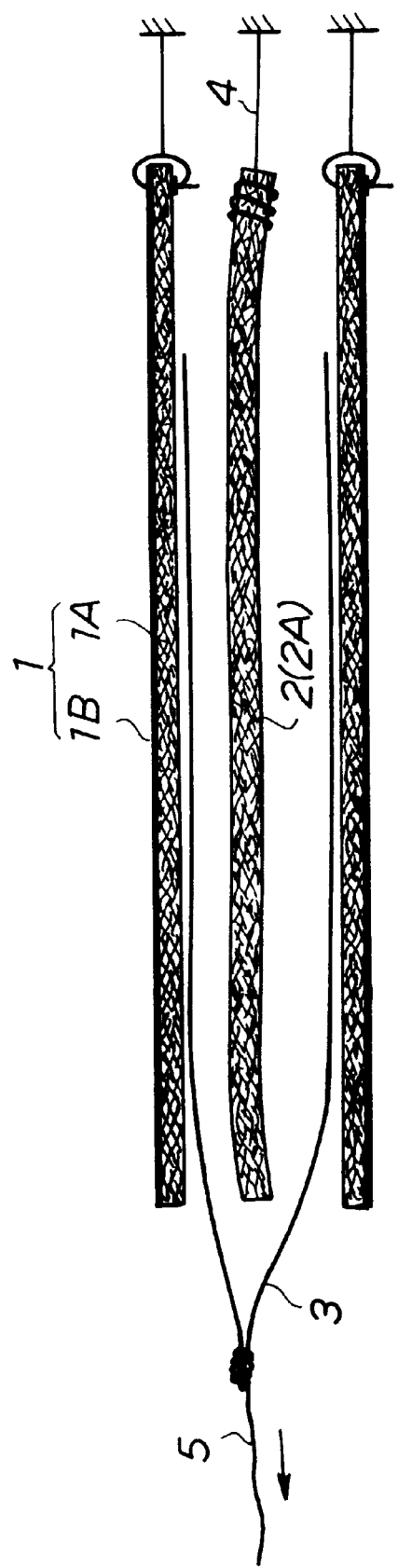
Figure 4:
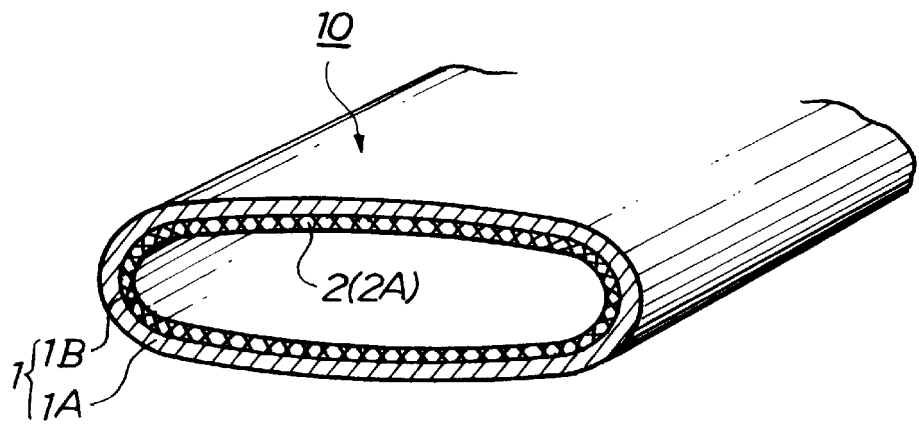
FIG. 4 is a partial perspective view illustrating a pipe liner bag manufactured by the manufacturing method according to the first embodiment.
Figure 5:
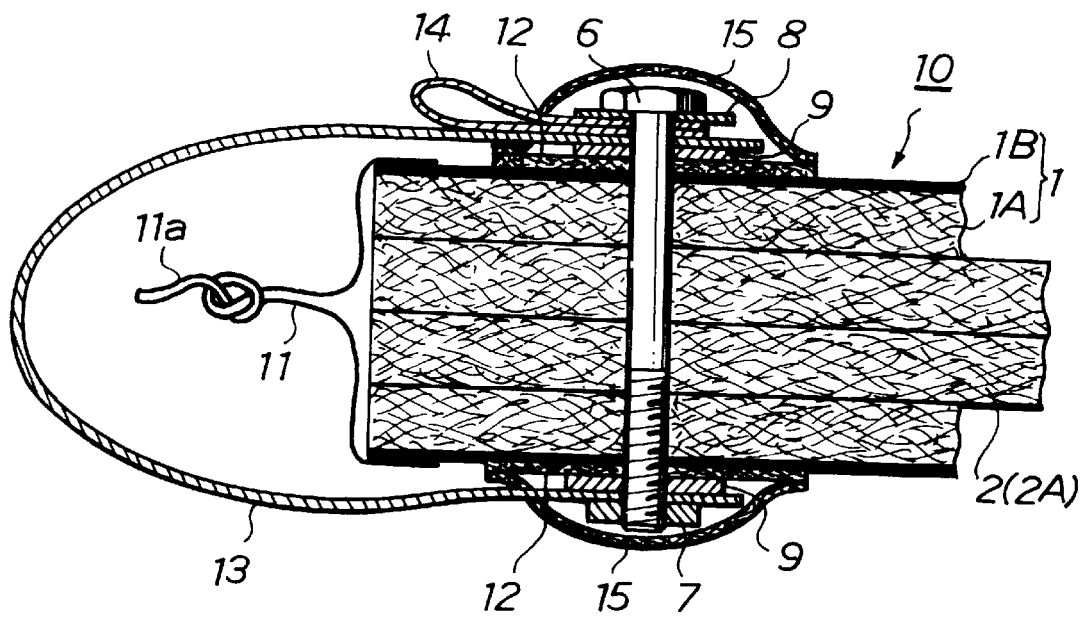
FIG. 5 is an enlarged view illustrating in detail an end machined portion of the pipe liner bag manufactured by the manufacturing method according to the first embodiment.

First, a first embodiment of the present invention will be described. FIGS. 1 through 3 are cross-sectional views illustrating, in order, the steps of a manufacturing method according to the first embodiment. FIG. 4 is a partial perspective view illustrating a pipe liner bag manufactured by the method according to the first embodiment, and FIG. 5 is an enlarged view illustrating in detail an end machined portion of the pipe liner bag.

In the method of the first embodiment, a guiding tube 3 is inserted inside out by a fluid pressure such as air pressure or the like, by way of example, into an outer layer 1 composed of a tubular resin absorbent material 1A and a highly air-tight plastic film 1B covering the outer periphery of the tubular resin absorbent material 1A, as illustrated in FIG. 1. The guiding tube 3 is composed of a tubular film, a tubular composite film or a composite structure having layered plastic film and unwoven fabric or split fiber. The inner and outer surfaces of the guiding tube 3 are smooth, and the outer peripheral surface, before eversion, is applied with a lubricant such as oil, liquid or powder wax, or the like. Therefore, when the guiding tube 3 is inserted inside out into the outer layer 1, the inner peripheral surface of the guiding tube 3 is applied with a lubricant such as oil. As can be seen in FIG. 1, a pull rope (or belt) 4 is connected at an end portion of the guiding tube 3.

When the guiding tube 3 has been completely everted into the outer layer 1 over the entire length thereof, the pull rope (or belt) 4 is drawn into the guiding tube 3. In this event, one end of the pull rope (or belt) 4 is attached to one end of an inner layer 2 comprising another tubular resin absorbent material 2A, as illustrated in FIG. 2. It should be noted that the diameter of the tubular resin absorbent material 2A constituting the inner layer 2 is set larger than the diameter of the tubular resin absorbent material 1A constituting the outer layer 1.

Then, as illustrated in FIG. 2, the pull rope 4 is pulled in the direction indicated by arrows (to the right in FIG. 2), with the outer layer 1 and guiding tube 3 fixed at one end thereof, to pull the inner layer 2 into the guiding tube 3. In this event, since the inner peripheral surface of the guiding tube 3 is applied with a lubricant such as oil or the like, the inner layer 2 is smoothly inserted into the guiding tube 3 without resistance.

Next, referring to FIG. 3, after the inner layer 2 has been inserted in the guiding tube 3 over the entire length thereof, the guiding tube 3 is pulled by way of a pull rope (or belt) 5 in the direction indicated by the arrow (to the left in FIG. 3) to extract the guiding tube 3. This results in the inner layer 2 attached to the outer layer 1. End portions of these layers 1, 2 undergo end machining as illustrated in detail in FIG. 5.

The end machining is performed in the following manner.

First, one end of the outer layer 1 and one end of the inner layer 2 are fixed using a bolt 6, a nut 7, and washers 8, 9, and end faces of the outer layer 1 and the inner layer 2 are covered with a highly air-tight end cover 11. It should be noted that the end cover 11 is integrally formed with an air vent duct 11a which is tied as illustrated, when ventilation is terminated for the outer layer 1 and the inner layer 2, to prevent air from introducing into or exiting from the internal space.

Base members 12 are adhered on both surfaces of the outer layer 1 through which the bolt 6 extends, and a pull rope attaching belt 13 and a hot water attaching belt 14 are fixed by the bolt 6 at end portions of the outer layer 1 and the inner layer 2. The bolt 6, the nut 7, and the washers 8, 9, exposed to the outside, are covered with a jacket 15. The base members 12 and the jacket 15 are made by coating one surface of unwoven fabric with a plastic film.

When the above-described end machining is terminated, the respective tubular resin absorbent materials constituting the outer layer 1 and the inner layer 2 are impregnated with thermosetting resin such as unsaturated polyester or the like to provide a pipe liner bag 10 having a two-layer structure of the outer layer 1 and the inner layer 2, as illustrated in FIG. 4.

According to the present invention, the outer layer 1 and the inner layer 2 may be manufactured individually. A method of manufacturing the outer layer 1 will be described below with reference to FIGS. 6 through 10. FIG. 6 through 9 are explanatory diagrams illustrating various steps of the method of manufacturing the outer layer 1 in order, and FIG. 10 is a cross-sectional view illustrating an evacuated tubular resin absorbent material 1A.

Figure 6:
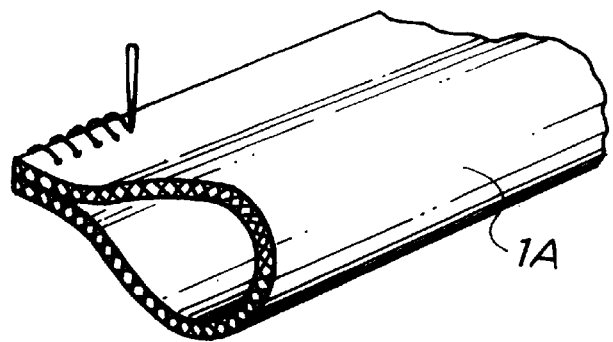
FIGS. 6 through 9 are explanatory diagrams illustrating, in order, various steps of a method of manufacturing an outer layer.
Figure 7:
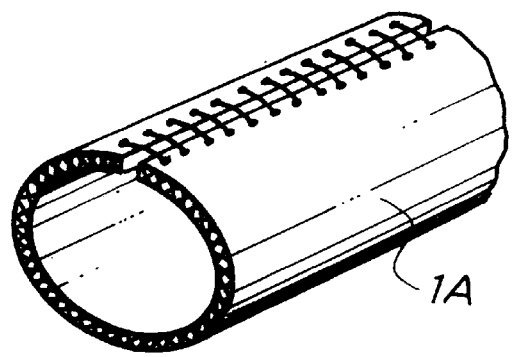

In the manufacturing of the outer layer 1, first, both edges in the width direction of a resin absorbent material 1A cut into a strip shape are overlapped, and the overlapping edge portions are sewed together (lock sewing) into a tubular shape, as illustrated in FIG. 6. After the sewing operation is completed, the seam is stretched in the circumferential direction to form a tubular resin absorbent material 1A which has both the edges in the width direction abutted to each other, as illustrated in FIG. 7. Here, the resin absorbent material 1A is made of high melting point unwoven fabric comprising a simple or a mixture of polyester, acrylic, nylon, glass, carbon, ceramic, and so on.

Other than the lock sewing, the tubular resin absorbent material 1A may be made by joining the abutted edges of the strip resin absorbent material 1A by straight sewing, punching using needles, welding, bonding using a bonding agent, or the like.

Figure 9:
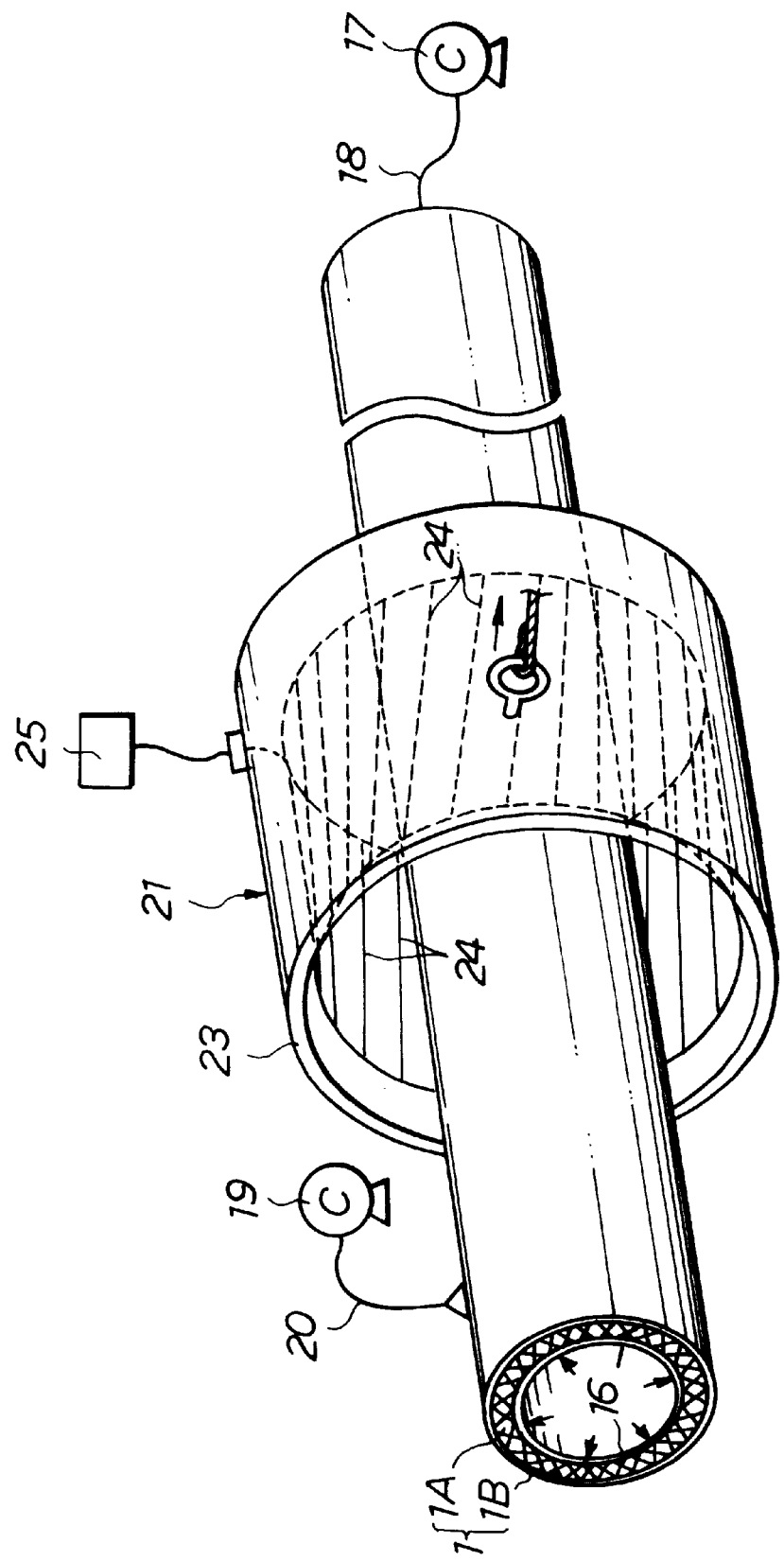
Figure 10:
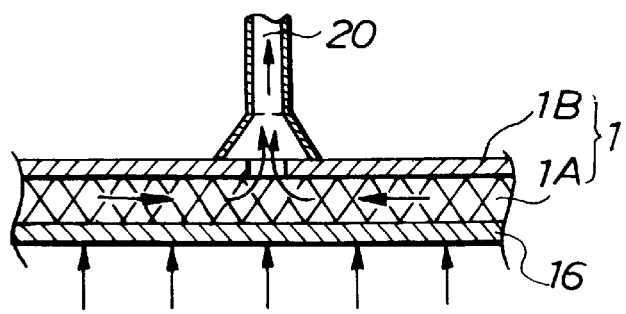
FIG. 10 is a cross-sectional view illustrating an evacuated tubular resin absorbent material.

Next, as illustrated in FIG. 9, the tubular resinabsorbent material 1A is inserted into a seamless tubular plastic film 1B, and a highly air-tight pressure tube 16 is also inserted into the resin absorbent material 1A. The plastic film may be made of polyethylene, polypropylene, nylon, polyvinyl chloride, or the like.

Figure 8:
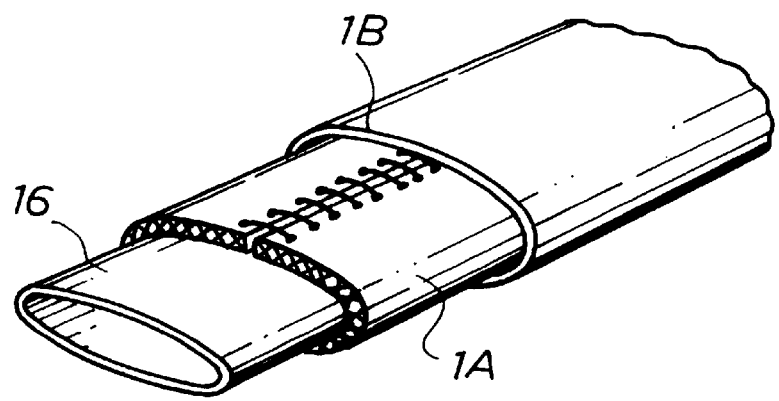

Next, in the state illustrated in FIG. 8, both ends of the pressure tube 16 are closed to hermetically seal the pressure tube 16. Then, as illustrated in FIG. 9, when compressed air is supplied into the pressure tube 16 from a compressor 17 through an air hose 18, the pressure tube 16 is inflated by the pressure applied by the compressed air to extend the resin absorbent material 1A and the plastic film 1B outwardly in a circular tube shape.

Next, with the above-mentioned state maintained unchanged, the resin absorbent material 1A is evacuated using a vacuum pump 19 and a vacuum hose 20, as illustrated in FIGS. 9 and 10, such that the plastic film 1B located outside the resin absorbent material 1A is attracted by negative pressure generated within the resin absorbent material 1A to come into close contact with the outer surface of the resin absorbent material 1A.

Subsequently, the resin absorbent material 1A together with the plastic film 1B and the pressure tube 16 is passed through a cylindrical heating apparatus 21, as illustrated in FIG. 9. The tubular assembly 1A, 1B, 16 is pulled by a pull rope 22, while the heating apparatus 21 is being driven, to move the tubular assembly over the entire length thereof through the heating apparatus 21 in the direction indicated by the arrow. Consequently, the plastic film 1B is heated by the heating apparatus 21 and gradually welded on the outer peripheral surface of the resin absorbent material 1A, whereby the outer peripheral surface of the resin absorbent material 1A is covered with the plastic film 1B. The heating apparatus 21 may comprise a plurality of linear electric heaters 24 obliquely mounted on the inner wall surface of a cylinder 23 having a diameter sufficiently larger than that of the resin absorbent material 1A. When the electric heaters 24 are powered from a power supply 25, the electric heaters 24 generate heat which is applied to the plastic film 1B for heating.

Figure 11:
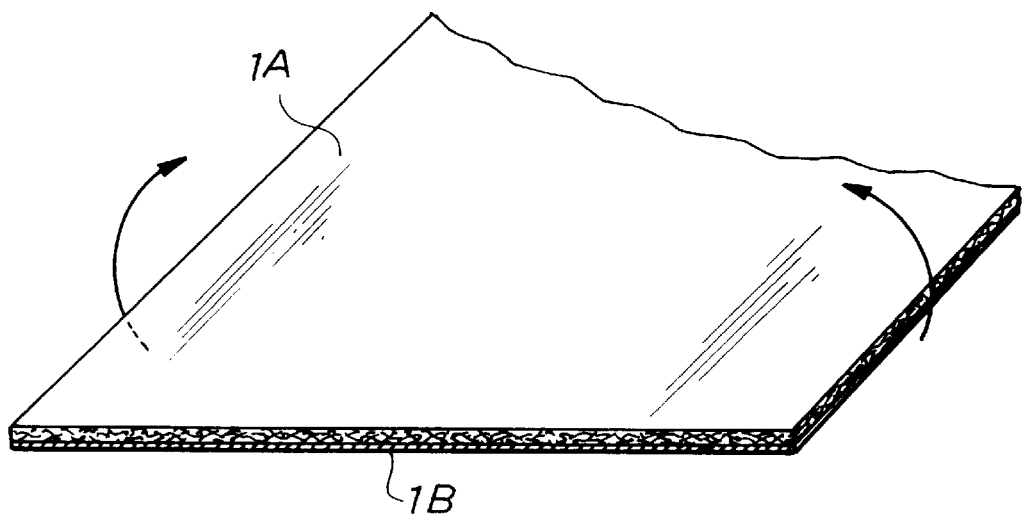
FIGS. 11 and 12 are partial perspective views illustrating another method of manufacturing the outer layer.
Figure 12:
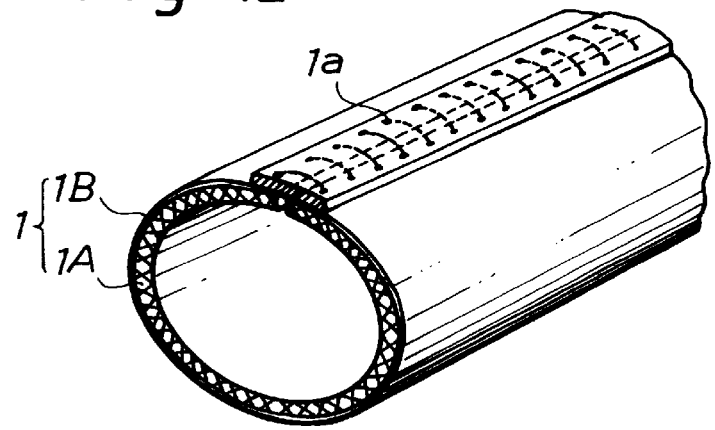

In the alternative, the outer layer 1 may be manufactured by a method illustrated in FIGS. 11 and 12. FIGS. 11 and 12 are partial perspective views illustrating another method of manufacturing the outer layer 1.

Specifically, as illustrated in FIG. 11, a strip-like resin absorbent material 1A having a plastic film 1B coated over one surface thereof is rolled with the plastic film 1B facing the outside, and both ends are joined by sowing. Then, an elongated unwoven fabric strip 1a is adhered by a thermal adhesive on the outer periphery of the resin absorbent material 1A along the joined portion to hermetically seal the joined portion. In this way, the outer layer 1 may also be provided. A polyethylene or nylon group thermal adhesive may be used as the thermal adhesive of this embodiment.

The inner layer 2 is manufactured by a method similar to that described with reference to FIGS. 6 and 7.

Specifically, though not shown, both edges in the width direction of a resin absorbent material 2A cut into a strip shape are overlapped, and the overlapping edge portions are sewed together (lock sewing) into a tubular shape. After the sewing operation is completed, the seam is stretched in the circumferential direction to form a tubular resin absorbent material 2A which has both the edges in the width direction abutted to each other. Here, a specific material for the resin absorbent material 2A may be selected from those used for the tubular resin absorbent material 1A of the outer layer 1.

Other than the lock sewing, the tubular resin absorbent material 2A may be made by joining the abutted edges of the strip resin absorbent material 2A by straight sewing, punching using needles, welding, bonding using a bonding agent, or the like.

According to this embodiment, since the outer layer 1 and the inner layer 2 can be manufactured individually, the respective manufacturing processes can be carried out with a high workability. In particular, the plastic film 1B coated over the outer surface of the outer layer 1 will not be scratched.

In addition, since the inner layer 2 is inserted into the inside of the outer layer 1 with the guiding tube 3 guiding the inner layer 2, the inner layer 2 can be smoothly inserted into the inside of the outer layer 1. When the inner layer 2 is inserted, the guiding tube 3 is extracted, so that the outer layer 1 and the inner layer 2 are laminated to provide a multi-layer structure. Then, the tubular resin absorbent materials 1A, 2A are impregnated with thermosetting resin, thus making it possible to readily manufacture a pipe liner bag 10 having a desired thickness with a high workability.

Next, a method of manufacturing a pipe liner bag according to a second embodiment will be described with reference to FIGS. 13 through 15. FIGS. 13 through 15 are cross-sectional views illustrating various steps of the manufacturing method according to the second embodiment in order.

Referring first to FIG. 13, an inner layer 2 composed of a tubular resin absorbent material 2A is pulled using a pull rope (or belt) 4 in the direction indicated by arrows (to the right in FIG. 13) to insert the same into a guiding tube 3. Here, the guiding tube 3 is composed of a tubular film, a tubular composite film or a composite structure having layered plastic film and unwoven fabric or split fiber, in a manner similar to the first embodiment. The inner and outer surfaces of the guiding tube 3 are smooth, and the outer peripheral surface is applied with a lubricant such as oil, liquid or powder wax, or the like. Therefore, the inner layer 2 can be smoothly inserted into the guiding tube 3 without resistance.

Next, referring to in FIG. 14, an outer layer 1 composed of a tubular resin absorbent material 1A and a plastic film 1B covering the outer periphery of the tubular resin absorbent material 1A is prepared, and one end thereof is fixed. Then, the inner layer 2 covered with the guiding tube 3 is pulled using the pull rope (or belt) 4 in the direction indicated by arrows (to the right in FIG. 14) to insert the same into the outer layer 1. It should be noted that in this event, since the outer peripheral surface of the guiding tube 3 is also applied with a lubricant such as oil or the like, the insertion of the inner layer 2 covered with the guiding tube 3 into the outer layer 1 can be carried out smoothly.

Next, referring to FIG. 15, once the inner layer 2 covered with the guiding tube 3 has been inserted into the outer layer 1 over the entire length thereof in the manner mentioned above, the guiding tube 3 is pulled by the pull rope (or belt) 5 in the direction indicated by the arrow (to the left in FIG. 15) to extract the same, with the outer layer 1 and the inner layer 2 being fixed. Subsequently, the outer layer 1 and the inner layer 2 are laminated, and end portions of these layers 1, 2 undergo end machining similar to that illustrated in FIG. 5.

After the end machining is terminated, the respective tubular resin absorbent materials constituting the outer layer 1 and the inner layer 2 are impregnated with thermosetting resin such as unsaturated polyester or the like to provide a pipe liner bag 10 having a two-layer structure of the outer layer 1 and the inner layer 2, similar to that illustrated in FIG. 4.

It should be noted that the outer layer 1 and the inner layer 2 used in the second embodiment are manufactured in a manner similar to those used in the first embodiment, and the inner layer 2 has a diameter larger than the outer layer 1, as is the case of the first embodiment.

Thus, since the second embodiment can also manufacture the outer layer 1 and the inner layer 2 separately, similar effects to those of the first embodiment can be provided.

In addition, since the inner layer 2 covered with the guiding tube 3 is inserted into the outer layer 1, the inner layer 2 can be smoothly inserted into the outer layer 1. The guiding tube 3 is extracted when the inner layer 2 has been completely inserted, so that the outer layer 1 and the inner layer 2 can be readily laminated to provide a multi-layer structure, thereby making it possible to manufacture the pipe liner bag 10 having a desired thickness with a good workability.

Next, a third embodiment of the present invention will be described with reference to FIG. 16. FIG. 16 is a partial cross-sectional view illustrating a manufacturing method according to the third embodiment of the present invention.

While the third embodiment is generally similar to the second embodiment, a guiding tube 3' has been previously inserted inside out into an outer layer 1 by a fluid pressure similar to that illustrated in FIG. 1, and an inner layer 2 covered with a guiding tube 3 is pulled using a pull rope (or belt) 4 in the direction indicated by the arrow (to the right in FIG. 16) to insert the same into the guiding tube 3', with one end of the outer layer 1 and one end of the guiding tube 3' being fixed, as illustrated in FIG. 16. Thereafter, the two guiding tubes two guiding tubes 3, 3' are extracted with the outer layer 1 and the inner layer 2 being fixed. Then, tubular resin absorbent materials 1A, 1B constituting the outer layer 1 and the inner layer 2 are impregnated with thermosetting resin to manufacture a pipe liner bag 10 similar to that illustrated in FIG. 4. It should be noted that at least one of the outer peripheral surface of the guiding tube 3 and the inner peripheral surface of the guiding tube 3' is applied with a lubricant such as oil, so that the insertion of the inner layer 2 covered with the guiding tube 3 into the guiding tube 3' is smoothly carried out. Therefore, the third embodiment can also provide similar effects to those of the first and second embodiments.

As will be apparent from the foregoing description, according to the present invention, the outer layer and the inner layer are separately manufactured, the manufacturing of each layer can be performed with a good workability. In addition, the plastic film coated on the outer peripheral surface of the outer layer is prevented from scratches.

Also, according to the present invention, since the inner layer is inserted into the outer layer as the inner layer is guided by the guiding tube, so that the inner layer can be smoothly inserted into the outer layer. Once the inner layer has been completely inserted, the guiding tube is extracted to readily laminate the outer layer and the inner layer to provide a multi-layer structure. Then, the tubular resin absorbent materials of the outer layer and the inner layer are impregnated with thermosetting resin. In this way, a pipe liner bag having a desired thickness can be manufactured with a good workability.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A method of manufacturing a pipe liner bag comprising the steps of:

preparing an outer layer comprising a tubular resin absorbent material and a plastic film coated over the outer periphery of the tubular resin absorbent material;

inserting a guiding tube into said outer layer;

inserting an inner layer composed of another tubular resin absorbent material into said guiding tube;

extracting said guiding tube with said outer layer and said inner layer being fixed; and impregnating the tubular resin absorbent materials of said outer layer and said inner layer with thermosetting resin.

2. A method of manufacturing a pipe liner bag according to claim 1, wherein:

said guiding tube is inserted inside out into said outer layer by a fluid pressure.

3. A method of manufacturing a pipe liner bag according to claim 1, wherein:

said guiding tube is composed of a tubular film, a tubular composite film or a composite structure having layered plastic film and unwoven fabric or split fiber.

4. A method of manufacturing a pipe liner bag according to claim 1, wherein:

said guiding tube is applied with a lubricant.

5. A method of manufacturing a pipe liner bag according to claim 1, further comprising the step of:

after extracting said guiding tube, fixing one end of said outer layer and one end of said inner layer with a bolt, a nut, and washers;

sealing said outer layer and said inner layer with an end cover; and covering the bolt, the nut, and the washers with a jacket.

6. A method of manufacturing a pipe liner bag according to claim 1, wherein:

said outer layer is manufactured by inserting a tubular resin absorbent material into said tubular plastic film, evacuating said tubular resin absorbent material to bring said plastic film into close contact with the outer surface of said tubular resin absorbent material, and heating said plastic film while maintaining the closely contacted state to weld said plastic film on the outer surface of said tubular resin absorbent material.

7. A method of manufacturing a pipe liner bag according to claim 6, wherein:

a highly air-tight pressure tube is inserted into said tubular resin absorbent material, said pressure tube is inflated with a fluid pressure to extend said plastic film and said tubular resin absorbent material outwardly in a circular tube shape, and said tubular resin absorbent material is evacuated to bring said plastic film into close contact with the outer surface of said tubular resin absorbent material.

8. A method of manufacturing a pipe liner bag according to claim 1, wherein:

said outer layer is manufactured by rolling a strip-like resin absorbent material having a plastic film coated over one surface thereof with the plastic film facing the outside, joining both ends, and hermetically sealing the joined portion.

9. A method of manufacturing a pipe liner bag as recited in claim 1, wherein:

said step of inserting an inner layer precedes said step of inserting said guiding tube.

10. A method of manufacturing a pipe liner bag as recited in claim 1, wherein:

a single guiding tube is inserted and extracted.

11. A method of manufacturing a pipe liner bag as recited in claim 1 in which said step of inserting an inner layer precedes said step of inserting a guiding tube.

12. A method of manufacturing a pipe liner bag as recited in claim 1 in which said step of inserting an inner layer is subsequent to said step of inserting a guiding tube.

13. A method of manufacturing a pipe liner bag as recited in claim 12 including the further step of inserting an inner layer into a second guiding tube.

14. A method of manufacturing a pipe liner bag comprising the steps of:

inserting an inner layer comprising a tubular resin absorbent material into a guiding tube;

preparing an outer layer composed of another tubular resin absorbent material and a plastic film coated over the outer periphery of the tubular resin absorbent material;

inserting said inner layer covered with said guiding tube into said outer layer;

extracting said guiding tube with said outer layer and said inner layer being fixed; and impregnating the tubular resin absorbent materials of said outer layer and said inner layer with thermosetting resin.

15. A method of manufacturing a pipe liner bag according to claim 14, wherein:

said guiding tube is inserted inside out into said outer layer by a fluid pressure.

16. A method of manufacturing a pipe liner bag according to claim 14, wherein:

said guiding tube is composed of a tubular film, a tubular composite film or a composite structure having layered plastic film and unwoven fabric or split fiber.

17. A method of manufacturing a pipe liner bag according to claim 14, wherein:

said guiding tube is applied with a lubricant.

18. A method of manufacturing a pipe liner bag according to claim 14, further comprising the step of:

after extracting said guiding tube, fixing one end of said outer layer and one end of said inner layer with a bolt, a nut, and washers;

sealing said outer layer and said inner layer with an end cover; and covering the bolt, the nut, and the washers with a jacket.

19. A method of manufacturing a pipe liner bag according to claim 14, wherein:

said outer layer is manufactured by inserting a tubular resin absorbent material into said tubular plastic film, evacuating said tubular resin absorbent material to bring said plastic film into close contact with the outer surface of said tubular resin absorbent material, and heating said plastic film while maintaining the closely contacted state to weld said plastic film on the outer surface of said tubular resin absorbent material.

20. A method of manufacturing a pipe liner bag according to claim 14, wherein:

said outer layer is manufactured by rolling a strip-like resin absorbent material having a plastic film coated over one surface thereof with the plastic film facing the outside, joining both ends, and hermetically sealing the joined portion.

21. A method of manufacturing a pipe liner bag comprising the steps of:

preparing an outer layer composed of a tubular resin absorbent material and a plastic film coated over the outer periphery of the tubular resin absorbent material;

inserting a first guiding tube into said outer layer;

inserting an inner layer composed of another tubular resin absorbent material into a second guiding tube;

inserting said inner layer covered with said second guiding tube into said first guiding tube;

extracting said first and second guiding tubes with said outer layer and said inner layer being fixed; and impregnating said respective tubular resin absorbent materials of said outer layer and said inner layer with thermosetting resin.

22. A method of manufacturing a pipe liner bag according to claim 21, wherein:

said guiding tube is inserted inside out into said outer layer by a fluid pressure.

23. A method of manufacturing a pipe liner bag according to claim 21, wherein:

said guiding tube is composed of a tubular film, a tubular composite film or a composite structure having layered plastic film and unwoven fabric or split fiber.

24. A method of manufacturing a pipe liner bag according to claim 21, wherein:

said guiding tube is applied with a lubricant.

25. A method of manufacturing a pipe liner bag according to claim 21, further comprising the step of:

after extracting said guiding tube, fixing one end of said outer layer and one end of said inner layer with a bolt, a nut, and washers;

sealing said outer layer and said inner layer with an end cover; and covering the bolt, the nut, and the washers with a jacket.

26. A method of manufacturing a pipe liner bag according to claim 21, wherein:

said outer layer is manufactured by inserting a tubular resin absorbent material into said tubular plastic film, evacuating said tubular resin absorbent material to bring said plastic film into close contact with the outer surface of said tubular resin absorbent material, and heating said plastic film while maintaining the closely contacted state to weld said plastic film on the outer surface of said tubular resin absorbent material.

27. A method of manufacturing a pipe liner bag according to claim 21, wherein:

said outer layer is manufactured by rolling a strip-like resin absorbent material having a plastic film coated over one surface thereof with the plastic film facing the outside, joining both ends, and hermetically sealing the joined portion.

28. A method of manufacturing a pipe liner bag comprising the steps of:

preparing an outer layer comprising a tubular resin absorbent material and a plastic film coated over the outer periphery of the tubular resin absorbent material;

inserting a guiding tube and an inner layer composed of another resin absorbent material into said outer layer;

extracting said guiding tube with said outer layer and said inner layer being fixed; and impregnating the tubular resin absorbent materials of said outer layer and said inner layer with thermosetting resin.

29. A method of manufacturing a pipe liner bag as recited in claim 28, wherein:

said guiding tube is composed of a tubular film, a tubular composite film or a composite structure having layered plastic film and unwoven fabric or split fiber.

30. A method of manufacturing a pipe liner bag as recited in claim 28, wherein:

said guiding tube is applied with a lubricant.

31. A method of manufacturing a pipe liner bag as recited in claim 28, further comprising the steps of:

after extracting said guiding tube, fixing one end of said outer layer and one end of said inner layer with a bolt, a nut and washers;

sealing said outer layer and said inner layer with an end cover; and covering the bolt, the nut and the washers with a jacket.

32. A method as recited in claim 28, wherein said step of inserting a guiding tube and an inner layer comprises the steps of sequentially inserting said guiding tube into said outer layer, and inserting said inner layer into said guiding tube.

33. A method as recited in claim 28, wherein said step of inserting a guiding tube and an inner layer comprises the steps of inserting said inner layer into said guiding tube, and inserting said guiding tube having said inner layer inserted therein into said outer layer.

34. A method as recited in claim 32, including the further steps of inserting said inner layer into a further guiding tube, and inserting said further guiding tube having said inner layer inserted therein into said outer layer lined with said guiding tube, and extracting said second guiding tube.

* * * * *